(12) United States Patent
Kim et al.

(10) Patent No.: US 8,094,531 B2
(45) Date of Patent: Jan. 10, 2012

(54) APPARATUS FOR AND METHOD OF DETECTING TRACKING ERROR SIGNALS

(75) Inventors: In-joo Kim, Suwon-si (KR); Tatsuhiro Otsuka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 878 days.

(21) Appl. No.: 12/108,827

(22) Filed: Apr. 24, 2008

(65) Prior Publication Data

US 2009/0147642 A1    Jun. 11, 2009

(30) Foreign Application Priority Data

Dec. 11, 2007 (KR) ........................ 10-2007-0128187

(51) Int. Cl.
*G11B 20/18* (2006.01)
*G11B 7/00* (2006.01)
(52) U.S. Cl. .................... 369/53.23; 369/44.41
(58) Field of Classification Search .................. None
See application file for complete search history.

(56) References Cited

U.S. PATENT DOCUMENTS

| 4,497,048 | A | 1/1985 | Kimura |
| 6,236,628 | B1 * | 5/2001 | Kim ............. 369/44.41 |
| 6,339,567 | B1 * | 1/2002 | Shimamoto et al. ....... 369/44.35 |
| 6,741,533 | B1 | 5/2004 | Hiratsuka et al. |
| 2006/0007806 | A1 * | 1/2006 | He et al. ............. 369/44.34 |
| 2006/0181996 | A1 * | 8/2006 | Matsumiya et al. ........ 369/53.23 |

FOREIGN PATENT DOCUMENTS

JP    2001-243643    9/2001

OTHER PUBLICATIONS

International Search Report and Written Opinion issued in corresponding International Patent Application No. PCT/KR2008/002574 dated Oct. 21, 2008.

* cited by examiner

*Primary Examiner* — Christopher R Lamb
(74) *Attorney, Agent, or Firm* — NSIP Law

(57) ABSTRACT

An apparatus for detecting a tracking error signal includes an optical detector to receive light beams reflected from an optical disc and having a plurality of detecting regions; and a phase difference extracting unit to extract a phase difference between a pair of optical signals output from the optical detector, wherein the phase difference extracting unit repeatedly moves a first graph representing one optical signal from among the pair of optical signals by a predetermined distance with respect to a second graph representing another optical signal from among the pair of optical signals, the first and second graph represent optical signal values with respect to t-axis, adds differences between optical signal values of the first graph and optical signal values of the second graph corresponding to predetermined positions of the t-axis, the adding differences is repeated for each of the repeatedly moved positions of the first graph, and outputs a moved distance of a position where the added value is smallest as a phase difference.

17 Claims, 11 Drawing Sheets

APPARATUS FOR AND METHOD OF DETECTING TRACKING ERROR SIGNALS

CROSS-REFERENCE TO RELATED APPLICATIONS

This application claims the benefit of Korean Patent Application No. 2007-128187, filed Dec. 11, 2007, in the Korean Intellectual Property Office, the disclosure of which is incorporated herein by reference.

BACKGROUND OF THE INVENTION

1. Field of the Invention

Aspects of the present invention relate to an apparatus for and method of detecting tracking error signals for an optical disc having a high recording density.

2. Description of the Related Art

In general, optical recording and/or reproducing apparatuses to record and/or reproduce data recorded in optical discs such as compact discs (CDs), digital versatile discs (DVDs), High Definition DVDs (HD-DVDs), or Blu-ray discs (BDs) irradiate light onto the optical disc, detect reflected light using an optical detector, and reproduce the data stored in the optical disc using the detected reflection light. In addition, in order to accurately track the optical disc during reproduction of the data, an optical reproducing apparatus detects tracking error signals from the reflected light detected by the optical detector, and compensates for tracking errors using tracking error signals. A differential phase detection (DPD) method is the primary method used to detect tracking error signals.

FIG. 1 is a block diagram showing a conventional tracking error signal detector. Referring to FIG. 1, the tracking error signal detector includes a quadrant optical detector 100, adders 111 and 112, equalizers 121 and 122, slicers 131 and 132, a phase difference detector 140, a subtractor 150, and a low pass filter (LPF) 160. When the quadrant optical detector 100 receives the light reflected by an optical disc (not shown), signals output from regions A and C of the quadrant optical detector 100 and signals output from regions B and D of the quadrant optical detector 100 are respectively added by the adders 111 and 112, and respectively equalized by the equalizers 121 and 122. The slicers 131 and 132 perform a binary coding operation on the signals output from the equalizers 121 and 122.

The phase difference detector 140 detects a phase difference between the binary coded A+C signal output from the slicer 131 and the binary coded B+D signal output from the slicer 132 by comparing the signals with each other. The phase difference detector 140 outputs a phase difference signal PD1 when the phase of the A+C signal leads the phase of the B+D signal, and outputs a phase difference signal PD2 when the phase of the B+D signal leads the phase of the A+C signal. The subtractor 150 detects a difference between the signal PD1 and the signal PD2 (PD1−PD2) output from the phase difference detector 140. The low pass filter (LPF) 160 performs a low pass filtering operation on the difference (PD1−PD2) output from the subtractor 150 to output a tracking error signal.

The optical signal received by the optical detector is sliced for binary-coding in order to compare the phases of the signals. However, if the optical signal includes a part that is not zero-cross sliced, the part is not reflected in the phase difference detection operation.

FIG. 2 shows optical signals S1 and S2 before being sliced and optical signals S1' and S2' after being sliced in a case where the optical signals received by the optical detector include parts Z that are not zero-cross sliced. The optical signals S1 and S2 including the parts Z that are not zero-cross sliced are generated by inter-symbol interference (ISI) caused when an optical recording density is increased. The parts Z are not reflected in the binary-coded optical signals S1' and S2', and are not used in the detection of the phase difference. The parts Z act as noise that causes a quality degradation of the tracking error signal. Therefore, a solution to solve this problem is required.

SUMMARY OF THE INVENTION

Aspects of the present invention provide an apparatus for and a method of detecting tracking error signals, to indicate a degradation of reproduction signals of a high density optical disc.

According to an aspect of the present invention, a method of extracting a phase difference between at least a pair of optical signals among a plurality of input optical signals includes the operations of repeatedly moving a first graph representing one optical signal from among the pair of optical signals by a predetermined distance with respect to a second graph representing another optical signal from among the pair of optical signals, the first and second graph represent optical signal values with respect to t-axis, adding differences between optical signal values of the first graph and optical signal values of the second graph corresponding to predetermined positions of the t-axis, and outputting a moved distance of a position where the added value is smallest as a phase difference.

According to another aspect of the present invention, a method of detecting a tracking error signal includes the operations of receiving light beams reflected by an optical disc using an optical detector having a plurality of detecting regions and extracting a phase difference between a pair of optical signals among a plurality of optical signals output from the optical detector, wherein the extracting comprises repeatedly moving a first graph representing one optical signal from among the pair of optical signals by a predetermined distance with respect to a second graph representing another optical signal from among the pair of optical signals, the first and second graph represent optical signal values with respect to t-axis, adding differences between optical signal values of the first graph and optical signal values of the second graph corresponding to predetermined positions of the t-axis, and outputting a moved distance of a position where the added value is smallest as a phase difference.

According to another aspect of the present invention, an apparatus to detect a tracking error signal includes an optical detector to receive light beams reflected from an optical disc and having a plurality of detecting regions, and a phase difference extracting unit to extract a phase difference between a pair of optical signals output from the optical detector, wherein the phase difference extracting unit repeatedly moves a first graph representing one optical signal from among the pair of optical signals by a predetermined distance with respect to a second graph representing another optical signal from among the pair of optical signals, the first and second graph represent optical signal values with respect to t-axis, adds differences between optical signal values of the first graph and optical signal values of the second graph corresponding to predetermined positions of the t-axis, and outputs a moved distance of a position where the added value is smallest as a phase difference.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
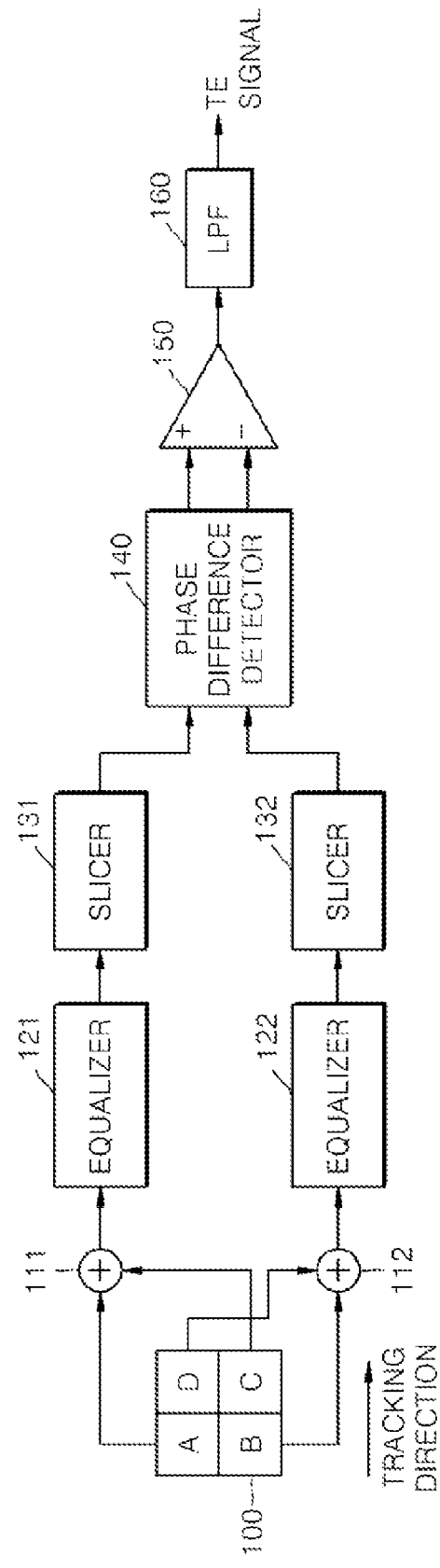
FIG. 1 is a block diagram of a conventional tracking error signal detecting apparatus.
Figure 2:
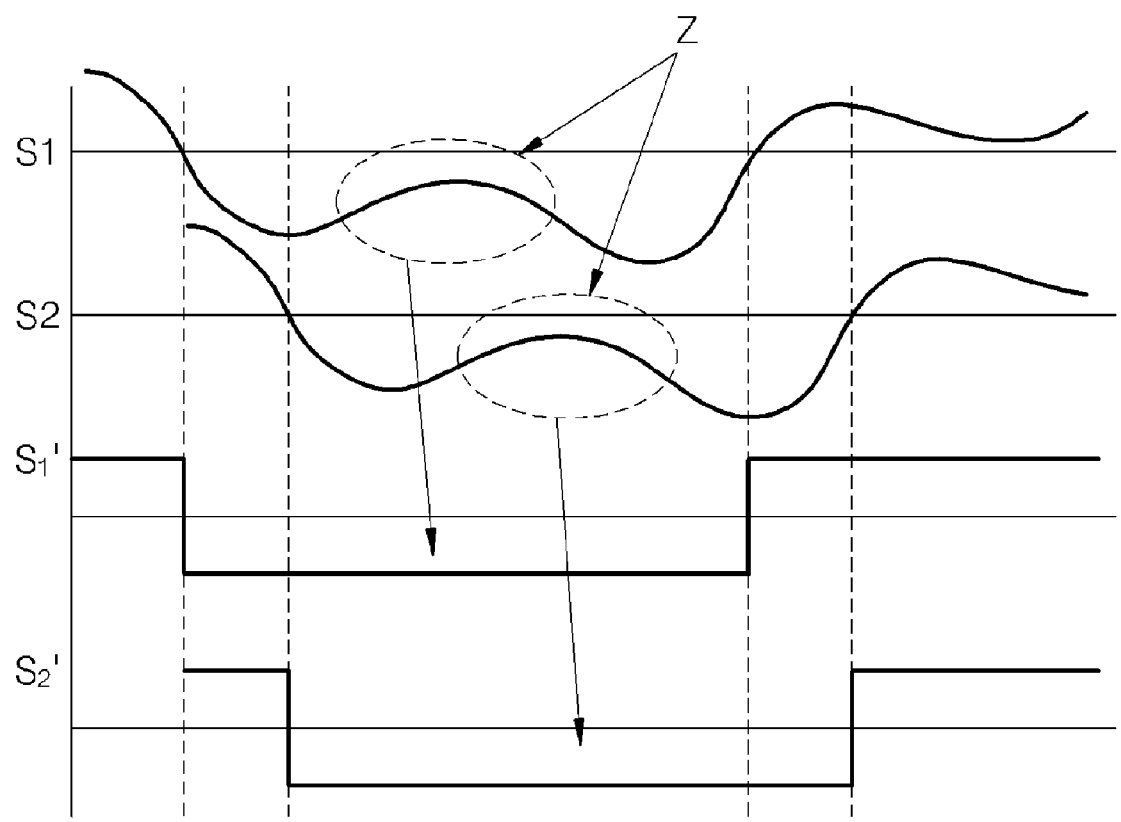
FIG. 2 is a graph illustrating examples of optical signals before and after performing a slicing operation in a case where the optical signals received by an optical detector include parts that are not zero-cross sliced.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
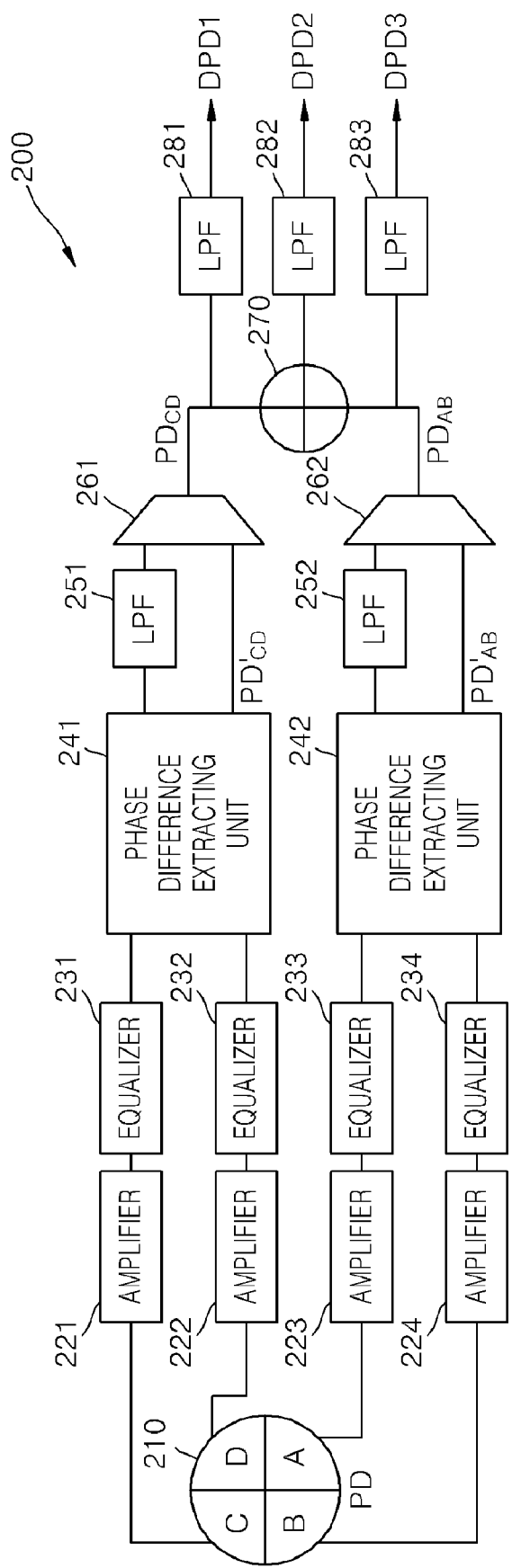
FIG. 3 is a block diagram illustrating a schematic structure of an apparatus to detect tracking error signals and a method of detecting the tracking error signals according to an embodiment of the present invention.

FIG. 3 is a block diagram illustrating a schematic structure of an apparatus to detect a tracking error signal and a method of detecting the tracking error signal according to an embodiment of the present invention. The tracking error signal detecting apparatus 200 detects a degree which a laser beam spot irradiated onto an optical disc deviates from a center of a pit as a tracking error signal during recording and/or reproducing data to and/or from the optical disc. Referring to FIG. 3, the tracking error signal detecting apparatus 200 includes an optical detector 210 and phase difference extracting units 241 and 242.

The optical detector 210 detects a ray reflected by the optical disc (not shown), and includes a plurality of detecting regions A, B, C, and D. Although four detecting regions A, B, C, and D are shown in FIG. 3, it is understood that number of the detecting regions is not limited to four, and varies according to other aspects of the present invention. Hereinafter, the optical detector 210, which is divided into four regions A, B, C, and D by an axis in a track direction and another axis perpendicular to the track direction. will be described as an example. Accordingly, two phase difference extracting units 241 and 242 are used.

Optical signals detected by the optical detector 210 at the detecting regions A, B, C, and D are input into phase difference extracting units 241 and 242 in pairs. Amplifiers 221, 222, 223, and 224 and equalizers 231, 232, 233, and 234 corresponding to the detecting regions of the optical detector 210 are further disposed between the optical detector 210 and the phase difference extracting units 241 and 242. The optical signals detected by the detecting regions A, B, C, and D are respectively amplified in the amplifiers 221, 222, 223, and 224, and waveforms of the optical signals are respectively equalized in the equalizers 231, 232, 233, and 234. Then, the optical signals are input into the phase difference extracting units 241 and 242 in pairs.

The phase difference extracting units 241 and 242 respectively extract a phase difference between the pair of input optical signals. In detail, one of the graphs representing one of the signals from among the pair of optical signals is repeatedly moved by a predetermined distance with respect to another graph representing another one of the signals from among the pair of optical signals. Differences between the optical signal values of the two graphs are added, which is repeated at each of the moved positions. Then, the moved distance of the position where the added value is smallest is output as the phase difference signal. Phase difference signals output from the phase difference extracting units 241 and 242 are represented as $PD'_{CD}$ and $PD'_{AB}$. A process of extracting the phase difference by the phase difference extracting units 241 and 242 will be described later with reference to FIG. 4 and other drawings.

The phase difference signals $PD'_{CD}$ and $PD'_{AB}$ output from the phase difference extracting units 241 and 242 are respectively filtered by low pass filters (LPF) 251 and 252, or input into selecting units 261 and 262 without passing through the LPFs 251 and 252. The selecting units 261 and 262 respectively select one of the phase difference signals according to a status of the signals and output the selected signals $PD_{CD}$ and $PD_{AB}$.

The phase difference signals $PD_{CD}$ and $PD_{AB}$ may be respectively filtered by low pass filters (LPF) 281 and 283 to remove high frequency components, in which case the phase difference signals $PD_{CD}$ and $PD_{AB}$ are output as tracking error signals DPD1 and DPD3. Otherwise, the phase difference signals $PD_{CD}$ and $PD_{AB}$ are added by an adder 270, filtered by the LPF 282 to remove the high frequency component from the added signal, and then, output as a tracking error signal DPD2. According to the statuses of the signals, one of the tracking error signals DPD1, DPD2, and DPD3 is used as the output tracking error signal.

Figure 4:
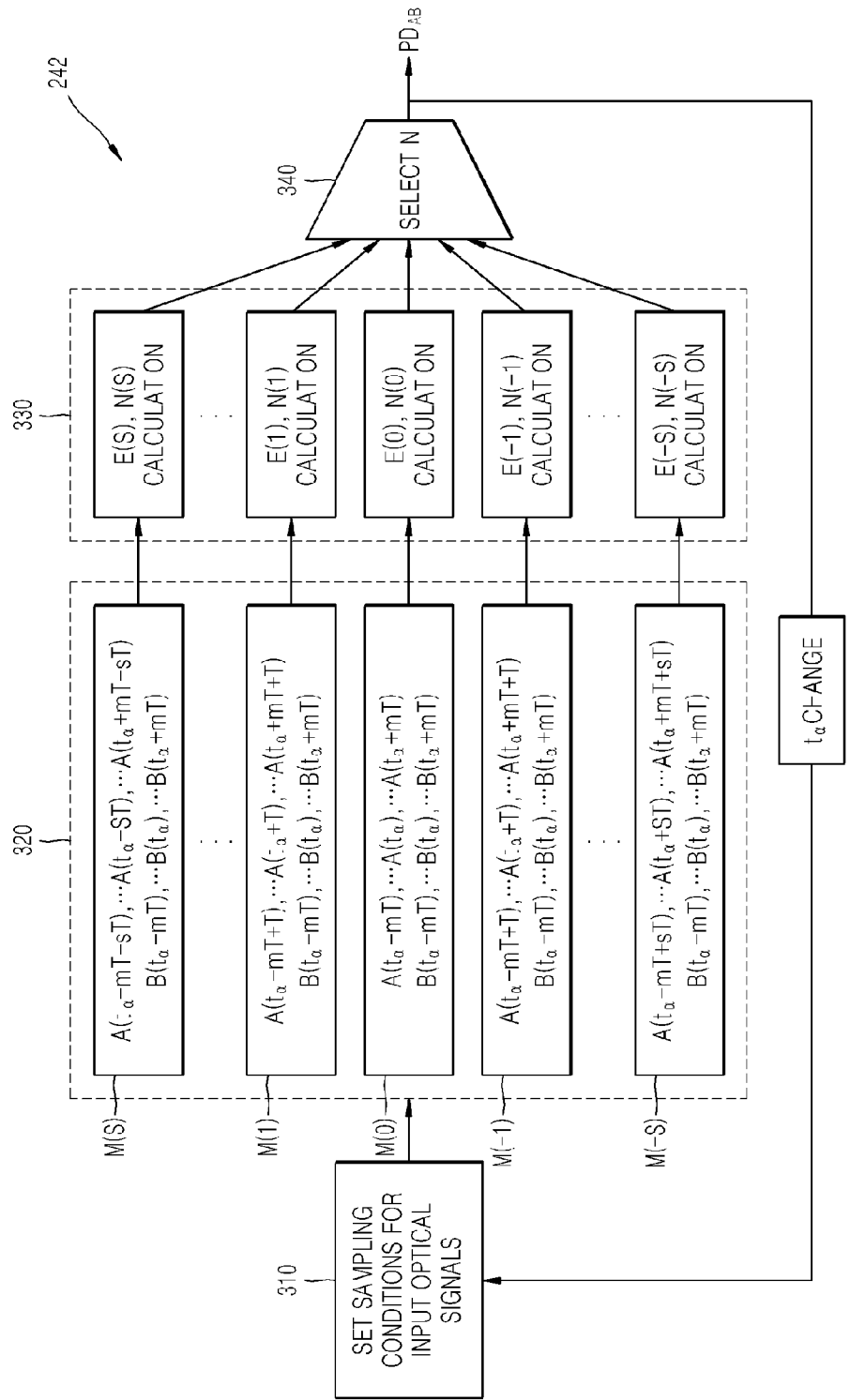
FIG. 4 is a block diagram of a phase difference extracting unit used in the tracking error signal detecting apparatus of FIG. 3.

FIG. 4 is a block diagram illustrating functions of the phase difference extracting unit 242 used in the tracking error detecting apparatus 200 of FIG. 3. The phase difference extracting unit 242 repeatedly moves one of the graphs, which represents one of optical signals in the pair of optical signals that are input into the phase difference extracting unit 242, by a predetermined distance with respect to the other graph representing the other optical signal in the pair of optical signals, and adds the differences between the optical signal values of the two graphs and repeats the adding the differences at each of the moved positions. Then, the phase difference extracting unit 242 outputs the moved distance of the position where the added value is smallest as the phase difference signal of the input signals. To perform this function, the phase difference extracting unit 242 includes a setting unit 310, a memory unit 320, a calculating unit 330, and a selecting unit 340.

The setting unit 310 sets sampling conditions of the optical signals to be used in a phase difference extraction operation. For example, when it is assumed that the optical signals received by the detecting regions A and B of the optical detector (210 of FIG. 3) and input into the phase difference extracting unit 242 are A(t) and B(t), sampling positions with respect to t are set. That is, a sampling interval T, a sampling integer m, and a sweep integer s, which are used to set the number of times of moving one optical signal graph with respect to the other graph, are set.

The signals A(t) and B(t) are sampled according to the set values T, m, and s, and the sampled signal values are stored in the memory unit 320. The memory unit 320 includes a plurality of memory cells M(r) ($-s \leq r \leq s$, s is a positive integer). The number of memory cells is 2s+1 according to the sweep integer s.

The method of sampling the signals A(t) and B(t) according to the set values T, m, and s, and a process of distributing the sampled signal values to each of the memory cells M(r) according to aspects of the present invention will be described in detail as follows.

First, a plurality of sampling positions $t_s$ are set as $t_\alpha+kT$ ($-m \leq k \leq m$, k is a positive integer) according to the sampling integer m and the sampling interval T with respect to a reference position $t_\alpha$.

Then, one of the signals A(t) and B(t) is moved relatively with respect to the other. Hereinafter, a case of moving the signal A(t) will be described as an example. The moving distance is determined as rT according to the sweep integer s and the sampling interval T, that is, a moved optical signal A(t−rT) is obtained. Signal values A($t_s$−rT) at the pre-set sampling positions are determined with respect to the signal A(t−rT).

The signal values A($t_s$−rT) and B($t_s$) at the sampling positions of the signals A(t−rT) and B(t) are recorded in each memory cell M(r).

Therefore, as shown in FIG. 4, a memory cell M(0) stores signal values A($t_\alpha$−mT), A($t_\alpha$), . . . A($t_\alpha$+mT) and B($t_\alpha$−mT), . . . , B($t_\alpha$), . . . , B($t_\alpha$+mT). In addition, a memory cell M(s) stores signal values A(tα−mT−sT), . . . , A($t_\alpha$−sT), . . . , A($t_\alpha$+mT−sT) and B($t_\alpha$−mT), . . . , B($t_\alpha$), . . . , B($t_\alpha$+mT), and a memory cell M(−s) stores signal values A($t_\alpha$−mT+sT), . . . , A($t_\alpha$+sT), . . . , A($t_\alpha$+mT+sT) and B($t_\alpha$−mT), . . . , B($t_\alpha$), . . . , B($t_\alpha$+mT).

The calculating unit 330 performs calculations necessary to extract the phase difference by using the signal values stored in each memory cell M(r) of the memory unit 320. An error value E(r), which is generated when the phases of the signals A(t) and B(t) do not coincide with each other, and a shift value N(r) of the signal A(t) relating to the error value E(r), are defined as in the following equation 1.

$$E(r) = \sum_{k=-m}^{k=m} |A(t_\alpha + kT - rT) - B(t_\alpha + kT)| \quad (1)$$

$$N(r) = r$$

That is, the value E(r) is obtained by calculating a difference between the signal values A(t) and B(t) at the same sampling position in the memory cell M(r) and adding the differences at all of the sampling positions, and N(r) is the number of sweeping operations corresponding to the error value E(r).

The selecting unit 340 selects the value N(r) corresponding to the smallest E(r) value among the values of E(r) and N(r) calculated by the calculating unit 330. With respect to the selected value N(r), a value N(r)T is a phase difference at the reference position $t_\alpha$.

The above process is repeatedly performed while changing the reference position $t_\alpha$. Accordingly, the phase difference signal PD'$_{AB}$ is output.

In the above description of FIG. 4, the phase difference extracting unit 242, to which the optical signals A(t) and B(t) are input, is described as an example of a component which outputs the phase difference signal PD'$_{AB}$. However, it is understood that other components of the tracking error signal detecting apparatus 200 may also be used to output phase difference signals, such as the phase difference extracting unit 241, which has substantially the same configuration as the phase difference extracting unit 242 shown in FIG. 4 according to an aspect of the present invention, although it is understood that the phase difference extracting units 241 and 242 may be configured differently from each other according to other aspects of the present invention.

FIGS. 5A through 5E illustrate examples of waveforms of the optical signals A(t) and B(t), and also illustrate a process of extracting the phase difference under the sampling conditions. In FIGS. 5A through 5E, the sampling integer m is 1 and the sweep integer s is 2, although it is understood that the sampling integer m and sweep integer s may have other integer or non-integer values. Since the value m is set as 1, the sampling positions are $t_\alpha$−T, $t_\alpha$, and $t_\alpha$+T. In addition, since the value s is set as 2, the optical signal A(t) is moved as much as −2T, −T, 0, T, and 2T to extract the phase difference.

Figure 5A:
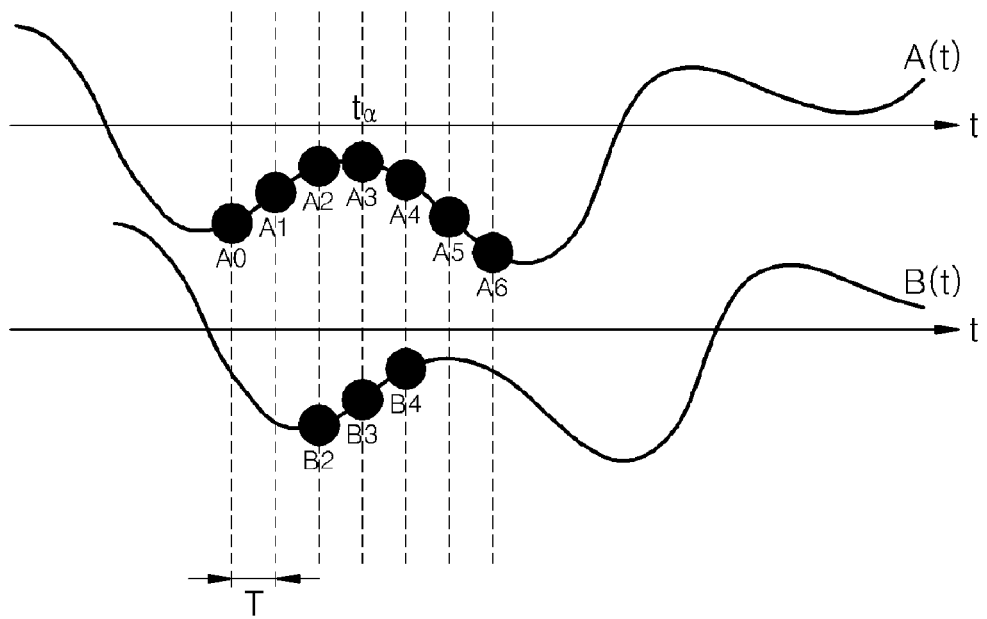
FIGS. 5A through 5E are diagrams showing waveforms and sampling conditions of A(t), B(t) to illustrate a process of detecting a phase difference.

FIG. 5A shows a case where the optical signal A(t) is not moved. In this case, the values E(0) and N(0) are as follows.

$$E(0) = \quad (2)$$
$$|A(t\alpha - T) - B(t\alpha - T)| + |A(t\alpha) - B(t\alpha)| + |A(t\alpha + T) - B(t\alpha + T)| =$$
$$|A2 - B2| + |A3 - B3| + |A4 - B4|$$
$$N(0) = 0$$

Figure 5B:
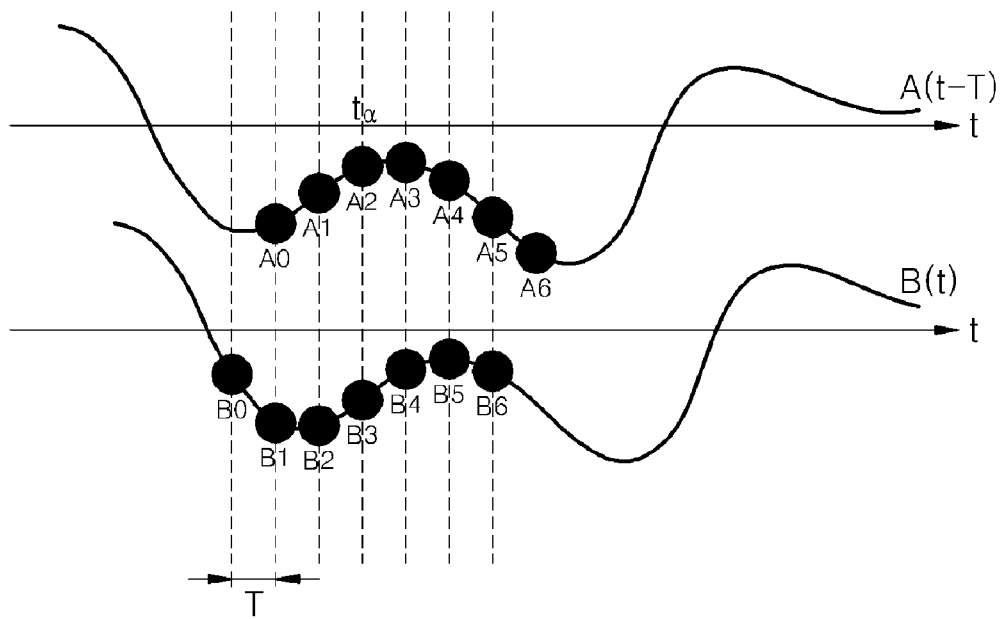

FIG. 5B shows a case where the optical signal A(t) is moved a distance T. In this case, the values E(1) and N(1) are as follows.

$$E(1) = |A(t\alpha - 2T) - B(t\alpha - T)| + |A(t\alpha - T) - B(t\alpha)| + \quad (3)$$
$$|A(t\alpha) - B(t\alpha + T)| = |A1 - B2| + |A2 - B3| + |A3 - B4|$$
$$N(1) = 1$$

Figure 5C:
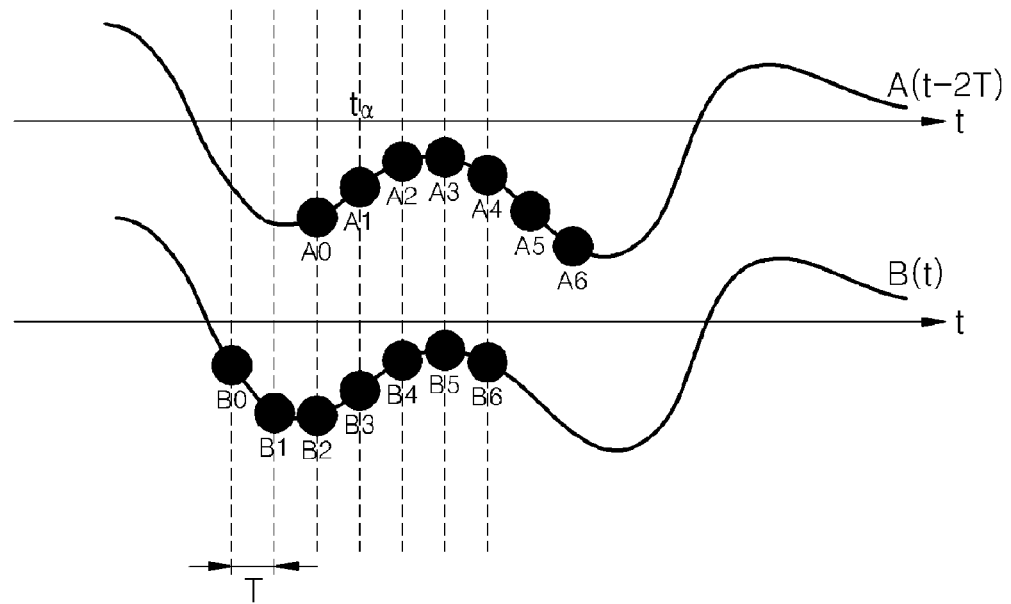

FIG. 5C shows a case where the optical signal A(t) is moved a distance 2T. In this case, the values E(2) and N(2) are as follows.

$$E(2) = |A(t\alpha - 3T) - B(t\alpha - T)| + |A(t\alpha - 2T) - B(t\alpha)| + \quad (4)$$
$$|A(t\alpha - T) - B(t\alpha + T)| = |A0 - B2| + |A1 - B3| + |A2 - B4|$$
$$N(2) = 2$$

Figure 5D:
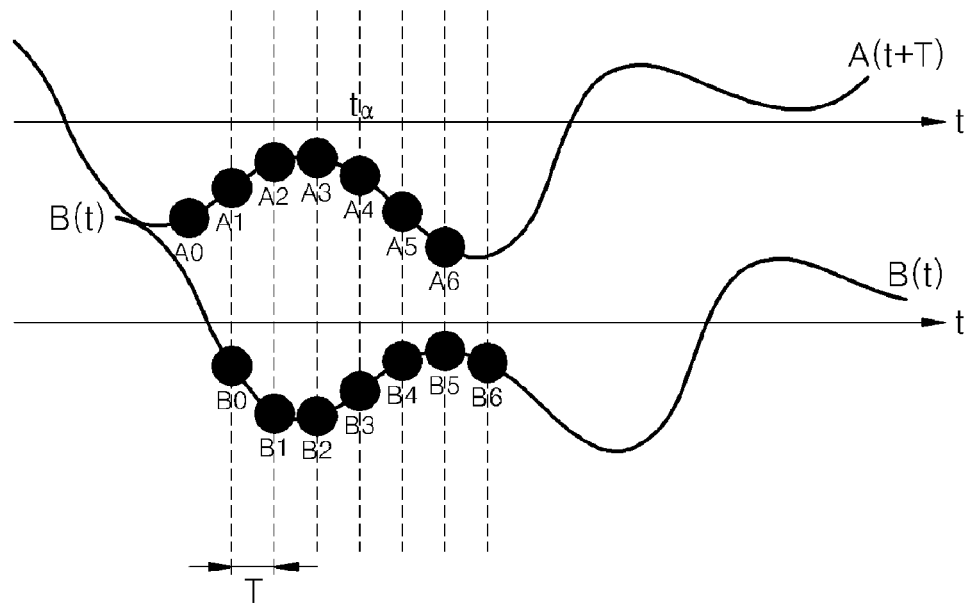

FIG. 5D shows a case where the optical signal A(t) is moved a distance −T, which is a distance having the magnitude of T in the opposite direction as T. In this case, the values E(−1) and N(−1) are as follows.

$$E(-1) = |A(t\alpha) - B(t\alpha - T)| + |A(t\alpha + T) - B(t\alpha)| + \\ |A(t\alpha + 2T) - B(t\alpha + T)| = |A3 - B2| + |A4 - B3| + |A5 - B4| \quad (5)$$

$$N(-1) = -1$$

Figure 5E:
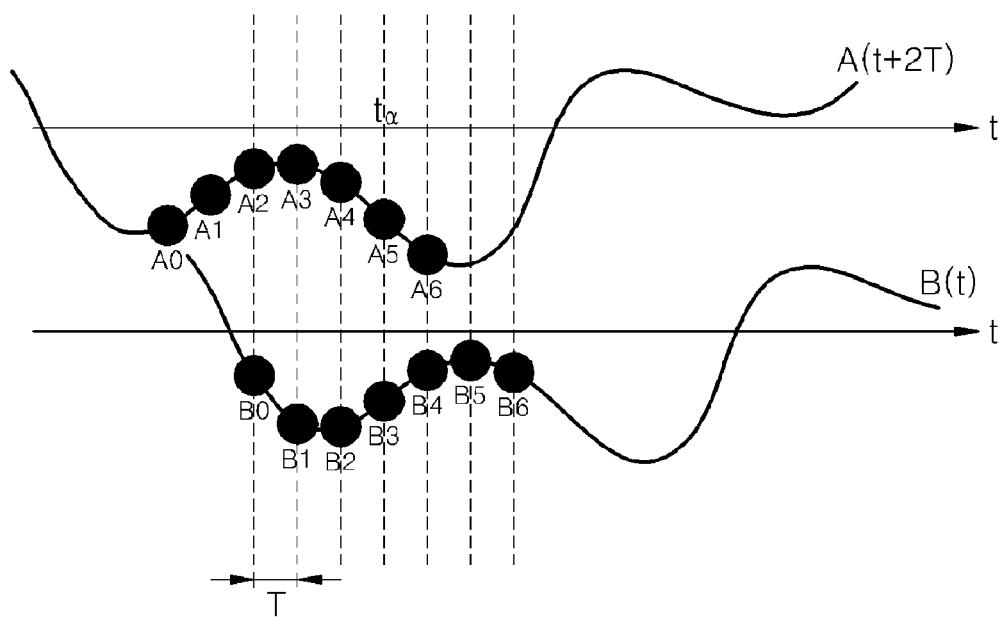

FIG. 5E shows a case where the optical value A(t) is moved a distance −2T. In this case, the values E(−2) and N(−2) are as follows.

$$E(-2) = |A(t\alpha) - B(t\alpha - T)| + |A(t\alpha + T) - B(t\alpha)| + \\ |A(t\alpha + 2T) - B(t\alpha + T)| = |A3 - B2| + |A4 - B3| + |A5 - B4| \quad (6)$$

$$N(-2) = -2$$

Figure 6:
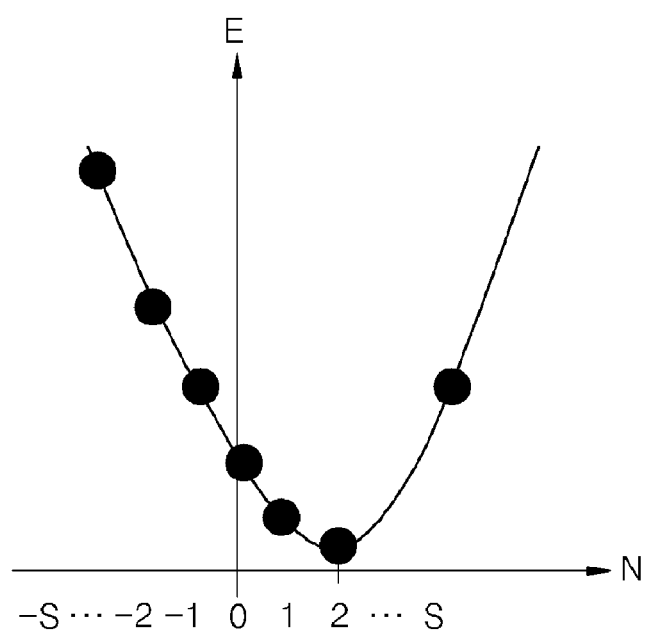
FIG. 6 is a graph showing an error value E calculated in the process illustrated in FIGS. 5A through 5E with respect to a movable value N.

FIG. 6 is a graph showing the error value E with respect to the movable value N. As shown in the graph of FIG. 6, the value N at which the error value E is the smallest is 2. Thus, the phase difference between the optical signals A(t) and B(t) at the position $t_\alpha$ is 2T.

Figure 7:
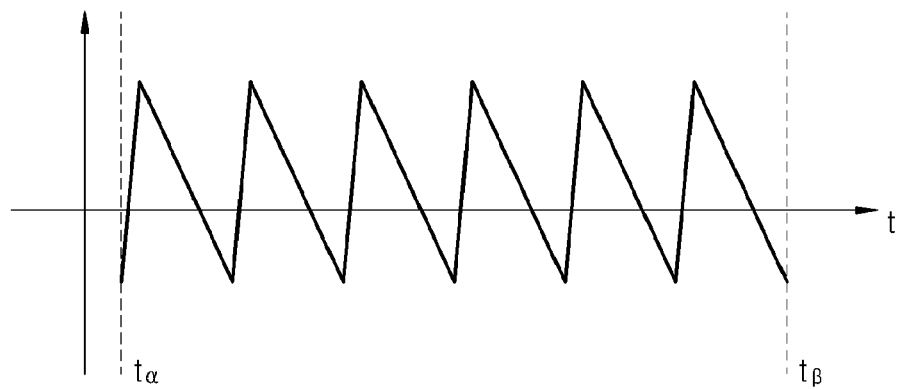
FIG. 7 is a graph showing an example of a waveform of a phase difference signal that is obtained by repeating the phase difference extraction within a reference time range of tα to tβ.

FIG. 7 is a graph showing an example of a phase difference signal that is obtained by repeating the phase difference extracting process when the reference time ranges from $t_\alpha$ to $t_\beta$. A waveform of the phase difference signal is obtained by directly extracting the phase difference without deforming the input optical signal, which allows the waveform of the phase difference signal to have a high quality of tracking error signal properties.

Figure 8A:
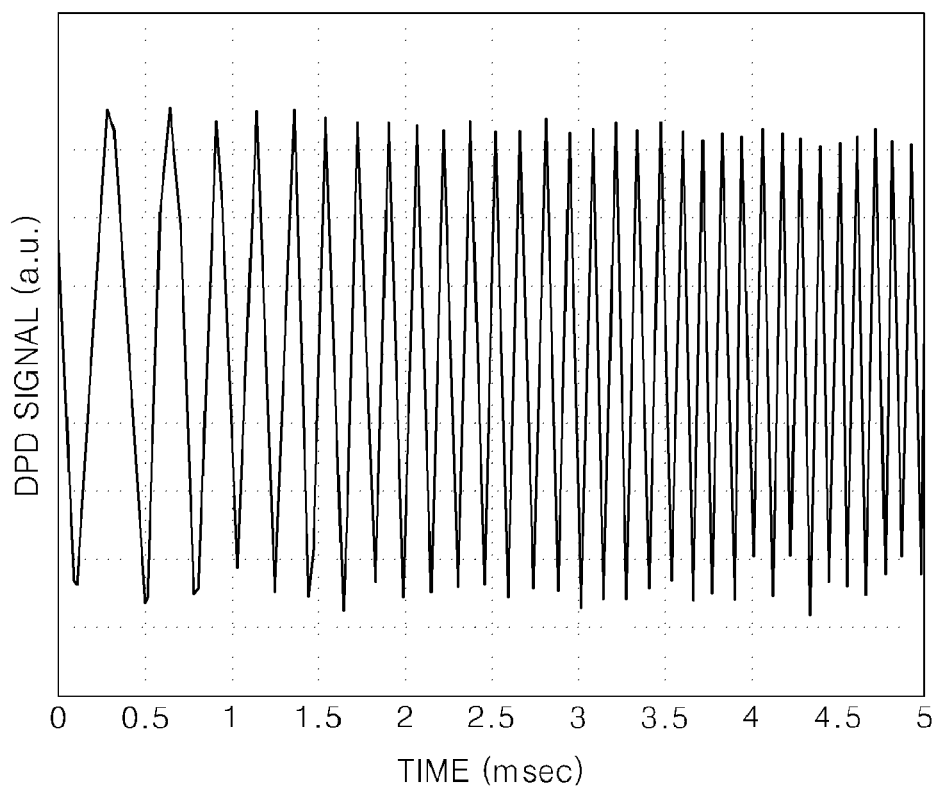
FIGS. 8A and 8B are graphs showing DPD signals obtained by the conventional tracking error signal detecting method and the tracking error signal detecting method according to an embodiment of the present invention, in an optical disc of a BD-ROM having a capacity of 25 GB.
Figure 8B:
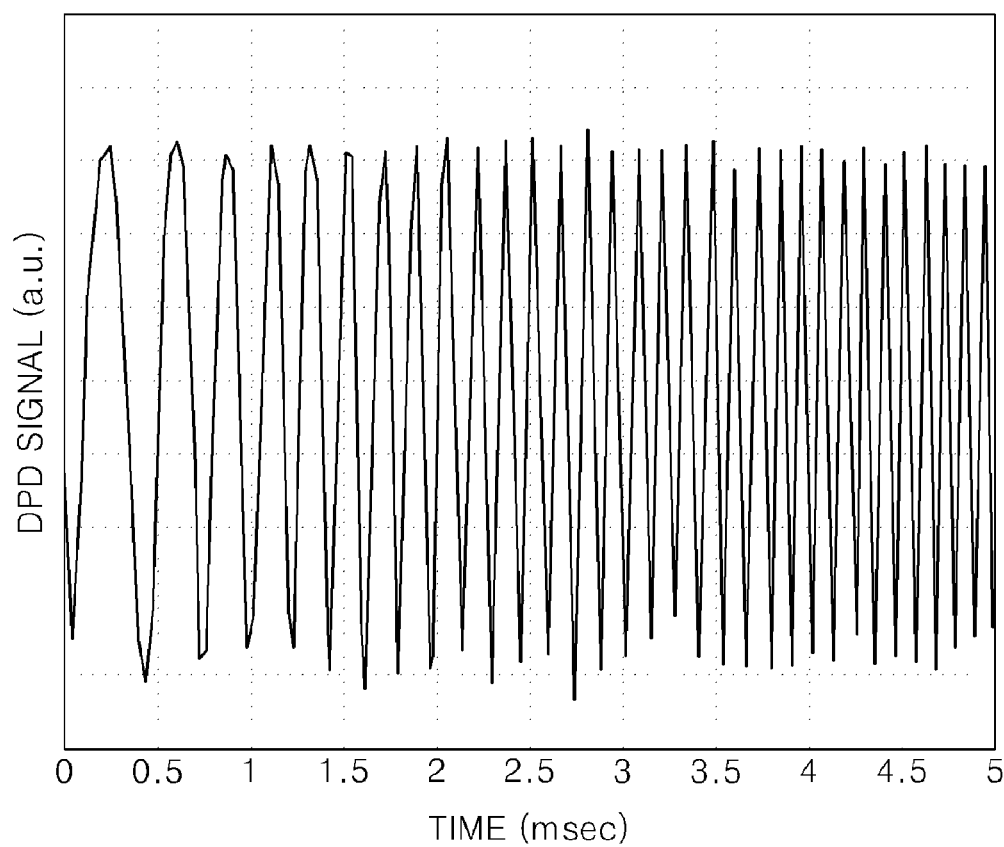
Figure 9A:
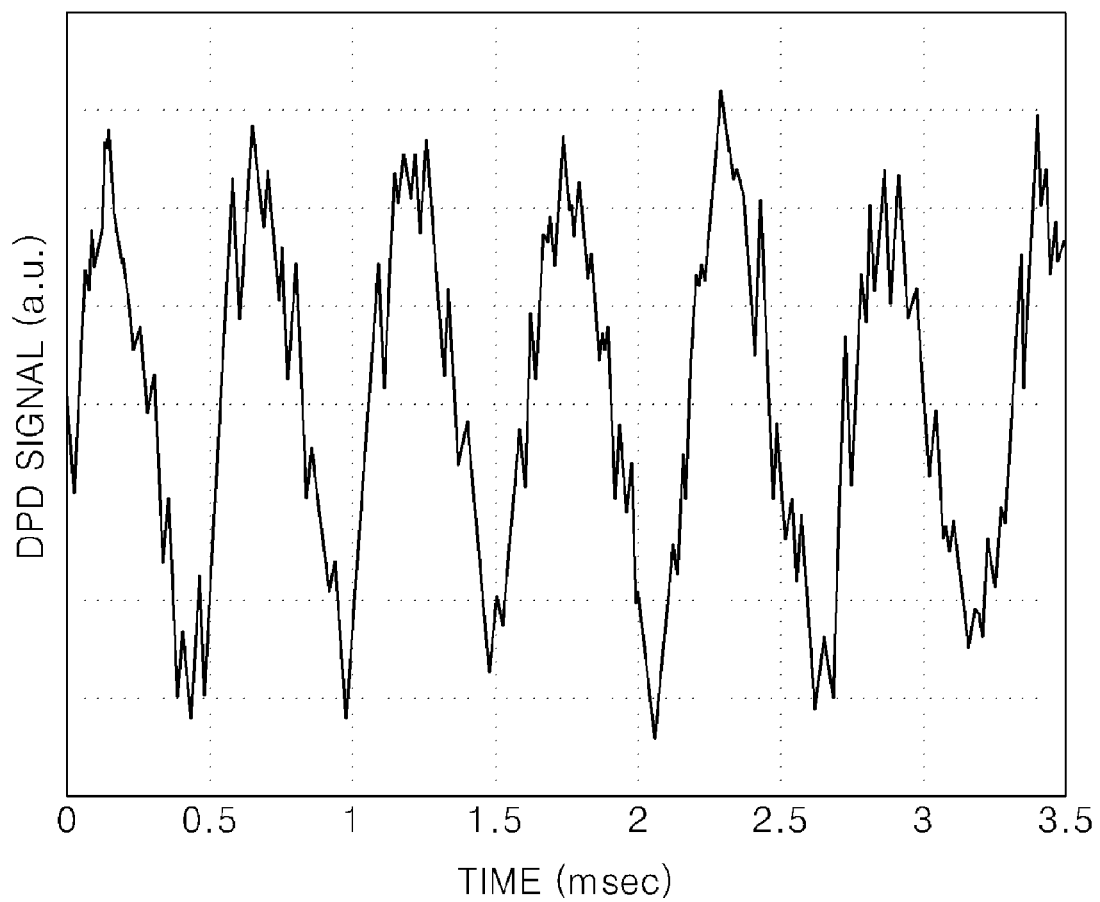
FIGS. 9A and 9B are graphs showing DPD signals obtained by the conventional tracking error signal detecting method and the tracking error signal detecting method according to an embodiment of the present invention, in an optical disc of a BD-ROM having a capacity of 40 GB.
Figure 9B:
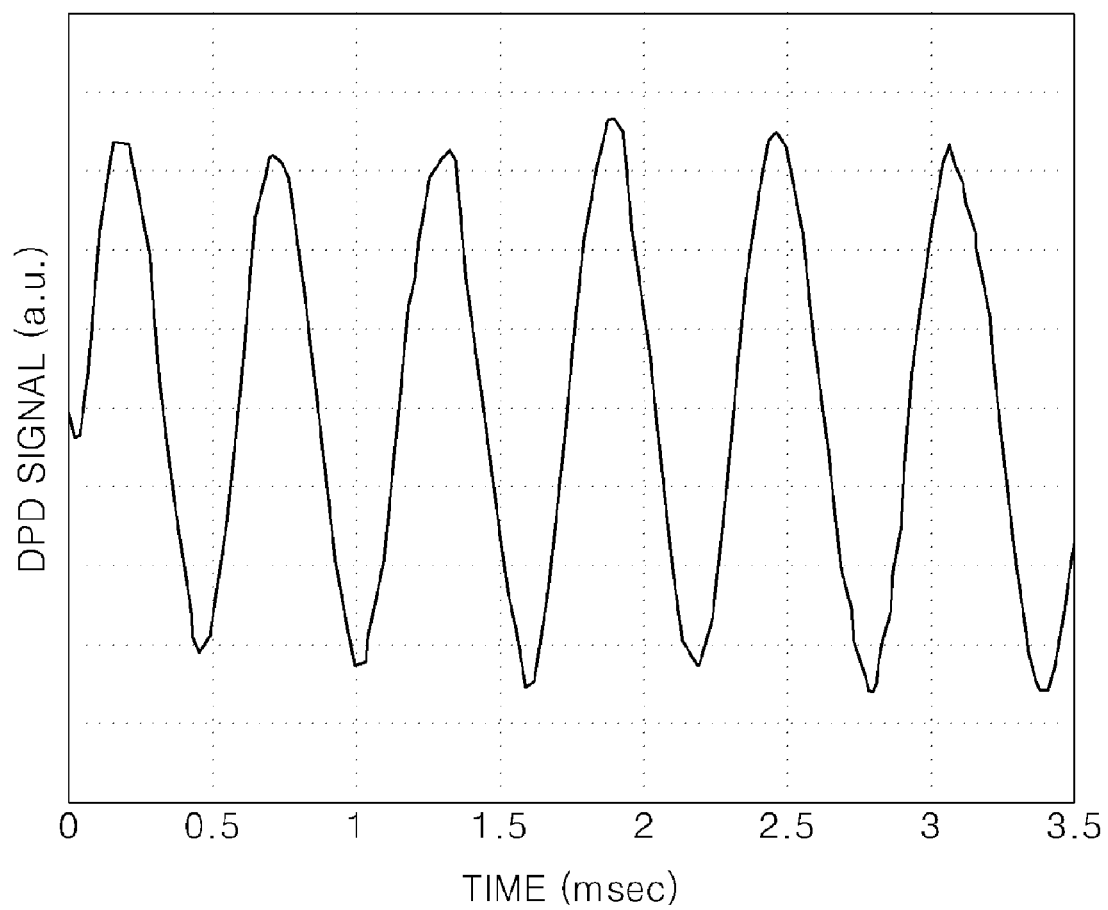

FIGS. 8A and 8B are graphs respectively showing DPD signals detected by tracking error signal detecting methods according to the conventional method and an embodiment of the present invention as used with an optical disc BD-ROM having a 25 GB capacity. FIGS. 9A and 9B are graphs respectively showing DPD signals detected by the tracking error signal detecting methods according to the conventional method and an embodiment of the present invention as used with an optical disc BD-ROM having a 40 GB capacity.

Referring to FIGS. 8A, 8B, 9A and 9B, in the case of the optical disc having a 25 GB capacity (FIGS. 8A and 8B), a waveform of the DPD signal detected by the conventional method and waveform of the present invention are similar to each other. However, in the case of the optical disc having a 40 GB capacity, the waveform of the DPD signal detected by aspects of the present invention has less noise than that of the conventional method. These, better tracking error signal properties are generated according to aspects of the present invention. That is, when the optical recording density is increased, the difference between the tracking error signal properties generated by the conventional method and tracking error signal properties generated by aspects of the present invention become greater. Since inter-symbol interference (ISI) behavior generally occurs with optical discs which have a recording density of 33 GB or greater, advantages of the tracking error signal detection method according to aspects of the present invention are very useful and create greater recording efficiency in optical discs having a capacity of 33 GB or greater.

According to the apparatus and method of detecting tracking error signals according to aspects of the present invention, the phase difference between the signals is directly extracted without slicing the optical signals from the optical discs and is used as the tracking error signal.

Therefore, even in cases where the optical signal reflected by the optical disc includes a part that is not zero-cross sliced, the phase difference of the part that is not zero-cross sliced is extracted. Thus, a high quality tracking error signal is output. That is, since the part that is not zero-cross sliced is used to determine the tracking error signal, noise and the degradation of reproducing signals generated by an optical disc of high recording density are reduced.

In addition, when the phase difference is extracted, basic operator circuits, such as the adder 270 (FIG. 3) or a subtractor (not shown) are used. Thus, the apparatus and method of detecting tracking error signals according to aspects of the present invention may utilize a simplified circuit design to perform the extracting operation. Furthermore, it is understood that aspects of the present invention can be embodied in computer-readable media. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of extracting a phase difference between a pair of optical signals among a plurality of input optical signals corresponding to detected light beams, the method comprising:
   detecting the plurality of input optical signals based on received light beams reflected from an optical disc;
   repeatedly moving a first graph representing one optical signal from among the pair of optical signals by a predetermined distance with respect to a second graph representing another optical signal from among the pair of optical signals, the first and second graph representing optical signal values with respect to a t-axis;
   adding differences between optical signal values of the first graph and optical signal values of the second graph corresponding to predetermined positions of the t-axis, the adding differences being repeated for each of the repeatedly moved positions of the first graph;
   outputting a moved distance of a position where the added value is smallest as a phase difference.

2. The method of claim 1, wherein the one optical signal comprises a first optical signal S1(t) and the another optical signal comprises a second optical signal S2(t), and the method further comprises:
   receiving the first optical signal S1(t) and the second optical signal S2(t);
   setting a plurality of sampling positions on the t-axis of the first and second optical signals S1(t) and S2(t), and setting a center position of the plurality of sampling positions as a reference position;

moving the first optical signal S1(t) in a direction along the t-axis a distance rT, wherein r=−s, −(s−1), . . . , −1, 0, 1, . . . , s−1, s, s comprises a natural number, and T comprises a distance between adjacent sampling positions;

adding the differences between S1(t−rT) and S2(t) at the plurality of sampling positions and storing the added values as a graph E(r); and outputting a value rT as the phase difference at the reference position wherein the value r corresponds to a minimum value of the graph E(r) among the 2s+1 number of E(r) values.

3. The method of claim 2, wherein the method of extracting a phase difference is repeated while changing the reference position and the extracted phase differences are output as a function of the reference position.

4. The method of claim 1, wherein the method is executed by a computing device configured to execute instructions.

5. A method of detecting a tracking error signal, the method comprising:

receiving light beams reflected by an optical disc using an optical detector having a plurality of detecting regions; and extracting a phase difference between a pair of optical signals among a plurality of optical signals output from the optical detector, wherein the extracting comprises:
repeatedly moving a first graph representing one optical signal from among the pair of optical signals by a predetermined distance with respect to a second graph representing another optical signal from among the pair of optical signals, the first and second graph representing optical signal values with respect to t-axis,
adding differences between optical signal values of the first graph and optical signal values of the second graph corresponding to predetermined positions of the t-axis, the adding differences being repeated for each of the repeatedly moved positions of the first graph;
outputting a moved distance of a position where the added value is smallest as a phase difference.

6. The method of claim 5, wherein the one optical signal comprises a first optical signal S1(t) and the another optical signal comprises a second optical signal S2(t), and the extracting of the phase difference further comprises:

receiving the first optical signal S1(t) and the second optical signal S2(t);

setting a plurality of sampling positions on the t-axis of the first and second optical signals S1(t) and S2(t), and setting a center position of the plurality of sampling positions as a reference position;

moving the first optical signal S1(t) in a direction along the t-axis a distance rT, wherein r=−s, −(s−1), . . . , −1, 0, 1, . . . , s−1, s, s comprises a natural number, and T comprises a distance between adjacent sampling positions;

adding the differences between S1(t−rT) and S2(t) at the plurality of sampling positions and storing the added values as a graph E(r); and outputting a value rT as the phase difference at the reference position wherein the value r corresponds to a minimum value of the graph E(r) among the 2s+1 number of E(r) values.

7. The method of claim 6, wherein the extracting of the phase difference is repeated while changing the reference position to generate a phase difference signal, and the extracted phase difference signal is output as a tracking error signal.

8. The method of claim 7, further comprising low-pass filtering the phase difference signal and outputting the filtered signal as the tracking error signal.

9. The method of claim 5, wherein the extracting of the phase difference is performed in a state without performing a slicing operation of the optical signals output from the optical detector which is used to binary-code the optical signals.

10. The method of claim 5, further comprising:
amplifying and equalizing each of the plurality of optical signals output from the optical detector.

11. An apparatus to detect a tracking error signal, the apparatus comprising:

an optical detector configured to receive light beams reflected from an optical disc and having a plurality of detecting regions; and a phase difference extracting unit configured to extract a phase difference between a pair of optical signals output from the optical detector, wherein the phase difference extracting unit is configured to:

repeatedly move a first graph representing one optical signal from among the pair of optical signals by a predetermined distance with respect to a second graph representing another optical signal from among the pair of optical signals, the first and second graph representing optical signal values with respect to t-axis;

add differences between optical signal values of the first graph and optical signal values of the second graph corresponding to predetermined positions of the t-axis, the adding differences being repeated for each of the repeatedly moved positions of the first graph; and output a moved distance of a position where the added value is smallest as a phase difference.

12. The apparatus of claim 11, wherein the one optical signal comprises a first optical signal S1(t) and the another optical signal comprises a second optical signal S2(t), and the phase difference extracting unit comprises:

a memory unit including a plurality of memory cells provided in a number corresponding to a value of r, configured to store signal values of S1(t−rT) and S2(t) at a plurality of sampling positions in a direction of the t-axis with respect to the pair of optical signals S1(t) and S2(t) while the optical signal S1(t) is moved a distance rT in the direction of the t-axis, wherein r=−s, −(s−1), . . . , −1, 0, 1, . . . s−1, s, s comprises a natural number, and T denotes a distance between adjacent sampling positions;

a calculating unit configured to add differences between S1(t−rT) and S2(t) at the plurality of sampling positions, in each of the memory cells and to store added values as a graph, E(r); and a selecting unit configured to select a minimum value of E(r) among the 2s+1 numbers of E(r) values and to output a value of rT as the phase difference.

13. The apparatus of claim 12, wherein the phase difference extracting unit repeats an operation of extracting the phase difference while changing a reference position among a plurality of sampling positions on the t-axis to generate a phase difference signal, and outputs the phase difference signal as a function of the reference position.

14. The apparatus of claim 13, further comprising:
a low pass filter configured to perform a low-pass filtering of the phase difference signal.

15. The apparatus of claim 11, wherein the optical signals are input into the phase difference extracting unit in a state where a slicing of the optical signals output from the optical detector which is used to binary-code the optical signals is not performed.

16. The apparatus of claim 11, further comprising:
an amplifier configured to amplify the plurality of optical signals output from the optical detector and an equalizer to equalize the amplified optical signals.

17. The apparatus of claim 11, wherein the optical disc has a recording capacity of 33 GB or greater.

* * * * *